(12) United States Patent
Ichihashi et al.

(10) Patent No.: US 12,480,803 B2
(45) Date of Patent: Nov. 25, 2025

(54) COMBINATION WEIGHING APPARATUS

(71) Applicant: ISHIDA CO., LTD., Kyoto (JP)

(72) Inventors: Ryo Ichihashi, Ritto (JP); Mikio Kishikawa, Ritto (JP); Takahide Kasugai, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 399 days.

(21) Appl. No.: 18/181,882

(22) Filed: Mar. 10, 2023

(65) Prior Publication Data
US 2023/0296423 A1 Sep. 21, 2023

(30) Foreign Application Priority Data
Mar. 18, 2022 (JP) .................. 2022-043747

(51) Int. Cl.
G01G 13/16 (2006.01)
B65G 65/00 (2006.01)

(52) U.S. Cl.
CPC .......... *G01G 13/16* (2013.01); *B65G 65/005* (2013.01)

(58) Field of Classification Search
CPC ...... G01G 13/16; G01G 19/393; G01G 23/00; G01G 17/00; B65G 65/005; B65G 47/72; B65G 65/32
(Continued)

(56) References Cited

U.S. PATENT DOCUMENTS 4,398,612 A * 8/1983 Mikami ............... G01G 19/343
222/196
4,467,880 A * 8/1984 Minamida ............ G01G 19/34
177/25.18
(Continued)

FOREIGN PATENT DOCUMENTS

CN 113387005 A 9/2021
JP H07-006501 Y2 2/1995
(Continued)

OTHER PUBLICATIONS

The extended European search report issued by the European Patent Office on Aug. 3, 2023, which corresponds to European Patent Application No. 23161958.9-1001 and is related to U.S. Appl. No. 18/181,882.
(Continued)

Primary Examiner — Jacques M Saint Surin
(74) Attorney, Agent, or Firm — Studebaker Brackett PLLC

(57) ABSTRACT

A combination weighing apparatus (1) according to an embodiment includes: a dispersion table (10) that receives and conveys an article that has been supplied from an outside; a driving unit (20) that applies conveyance force to the dispersion table (10), the conveyance force causing the article to be conveyed; a plurality of conveyors (11) that receives the article from the dispersion table (10), and conveys the article toward a downstream side; a plurality of hoppers (13) that temporarily receives a plurality of the articles that has been discharged from the plurality of conveyors (11), and discharges the plurality of the articles to the downstream side; an obtaining unit (30) that obtains a weight value of the article that is retained in each of the plurality of hoppers (13); and a controller (31) that performs combination calculation on a basis of the weight value that has been obtained by the obtaining unit (30). On a surface on which the article is conveyed in the dispersion table (10), a plurality of inclined faces (10S) is disposed, the plurality of inclined faces (10S) rising along a circumferential direction (D2) or a radiation direction (D1).

6 Claims, 9 Drawing Sheets

(58) Field of Classification Search
USPC .......................................................... 177/59
See application file for complete search history.

(56) References Cited

U.S. PATENT DOCUMENTS

| | | | | |
|---|---|---|---|---|
| 4,511,010 | A * | 4/1985 | Sashiki | ............... G01G 19/393 177/1 |
| 4,569,405 | A * | 2/1986 | Oshima | ............... G01G 13/022 177/25.18 |
| 4,570,831 | A | 2/1986 | Izumi et al. | |
| 4,678,046 | A * | 7/1987 | Mosher | ............... G01G 19/393 177/1 |
| 4,846,291 | A * | 7/1989 | Osawa | ................... G01G 13/18 177/25.18 |
| 5,088,592 | A * | 2/1992 | Palmers | .................. B29C 43/34 414/331.14 |
| 6,437,256 | B1 * | 8/2002 | Miyamoto | ........... G01G 19/393 177/25.18 |
| 10,151,622 | B2 * | 12/2018 | Hirose | ................. G01G 19/387 |
| 10,384,878 | B2 * | 8/2019 | Kageyama | ........... G01G 19/393 |
| 2021/0284463 | A1 | 9/2021 | Kishikawa | |
| 2022/0276087 | A1 * | 9/2022 | Kageyama | ........... G01G 19/387 |

FOREIGN PATENT DOCUMENTS

| | | |
|---|---|---|
| JP | 2010-281748 A | 12/2010 |
| JP | 2011-209156 A | 10/2011 |
| WO | 2008/074354 A1 | 6/2008 |
| WO | WO-2016143709 A1 * | 9/2016 ........... G01G 19/387 |

OTHER PUBLICATIONS

An Office Action; mailed by the China National Intellectual Property Administration of the People's Republic of China on May 30, 2025, which corresponds to Chinese Patent Application No. 202310246680.4 and is related to U.S. Appl. No. 18/181,882.

* cited by examiner

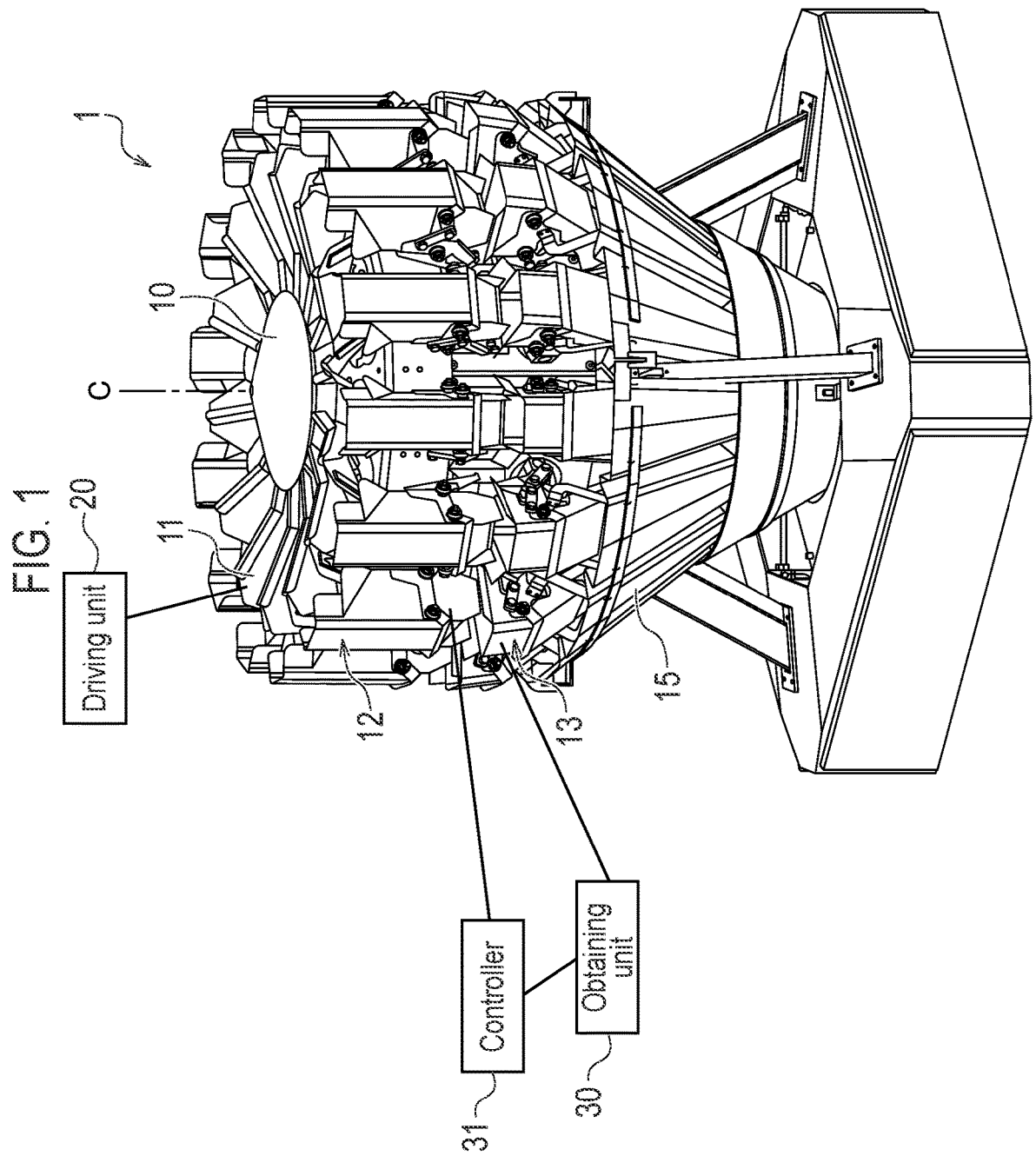

FIG. 4
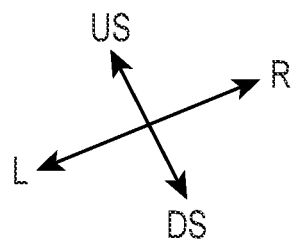
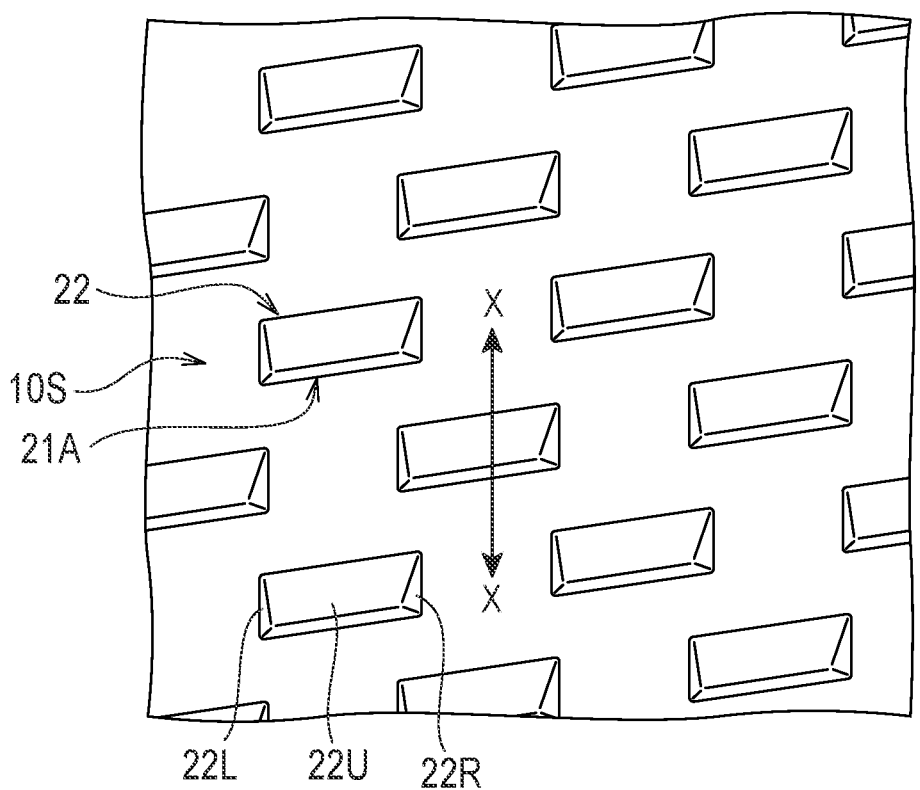

COMBINATION WEIGHING APPARATUS

CROSS-REFERENCE TO RELATED APPLICATIONS

This application is based upon and claims the benefit of priority from Japanese Patent Applications No. 2022-043747 filed on Mar. 18, 2022 in Japan, the entire contents of which are incorporated herein by reference.

TECHNICAL FIELD

The present invention relates to a combination weighing apparatus.

BACKGROUND ART

Conventionally, in order to disperse adhesive articles that are difficult to convey, such as raw chicken, onto a conveyor that is radially disposed, a dispersion table that is rotated by using a motor to convey the articles, and a dispersion table that conveys the articles by using vibration are known.

SUMMARY OF THE INVENTION

Technical Problem

However, the dispersion table that is rotated by using the motor to convey the articles has problems of a high cost, poor hygiene, and the like.

Furthermore, the dispersion table that conveys the articles by using vibration has a problem in which the articles adhere, and therefore the conveyance force of the conveyor (a feeder) is not transmitted to the articles, and the articles fail to be conveyed. In order to solve such problems, in a case where an inclination angle of such a dispersion table is increased, a problem in which the articles roll down on the dispersion table in one direction immediately after feeding the articles, and this causes a deterioration in dispersiveness, or a problem in which the height of an apparatus increases, and layout is limited newly arises.

Moreover, conventionally, as countermeasures against adhesion of the articles, or as an increase in conveyance force, it has been proposed that a serrated unevenness or groove is provided. However, there has been a problem in which it is difficult to apply this proposal to a dispersion table having a conical shape.

Accordingly, the present invention has been made in view of the problems described above, and it is an object of the present invention to provide a combination weighing apparatus that is capable of appropriately conveying adhesive articles to a conveyor.

Solution to Problem

A combination weighing device according to one embodiment is summarized as including a dispersion table that receives and conveys an article that has been supplied from an outside; a driving unit that applies conveyance force to the dispersion table, the conveyance force causing the article to be conveyed; a plurality of conveyors that receives the article from the dispersion table, and conveys the article toward a downstream side; a plurality of hoppers that temporarily receives a plurality of the articles that has been discharged from the plurality of conveyors, and discharges the plurality of the articles to the downstream side; an obtaining unit that obtains a weight value of the article that is retained in each of the plurality of hoppers; and a controller that performs combination calculation on a basis of the weight value that has been obtained by the obtaining unit, wherein on a surface on which the article is conveyed in the dispersion table, a plurality of inclined faces is disposed, the plurality of inclined faces rising along a circumferential direction or a radiation direction.

Advantageous Effects of Invention

According to an embodiment of the present invention, it is possible to provide a combination weighing apparatus that is capable of appropriately conveying adhesive articles to a conveyor.

BRIEF DESCRIPTION OF DRAWINGS

FIG. 1 is a diagram explaining an example of the entire configuration of a combination weighing apparatus according to an embodiment;

FIG. 4 is an enlarged view of a region B in FIG. 2A;

DESCRIPTION OF EMBODIMENTS

Figure 2A:
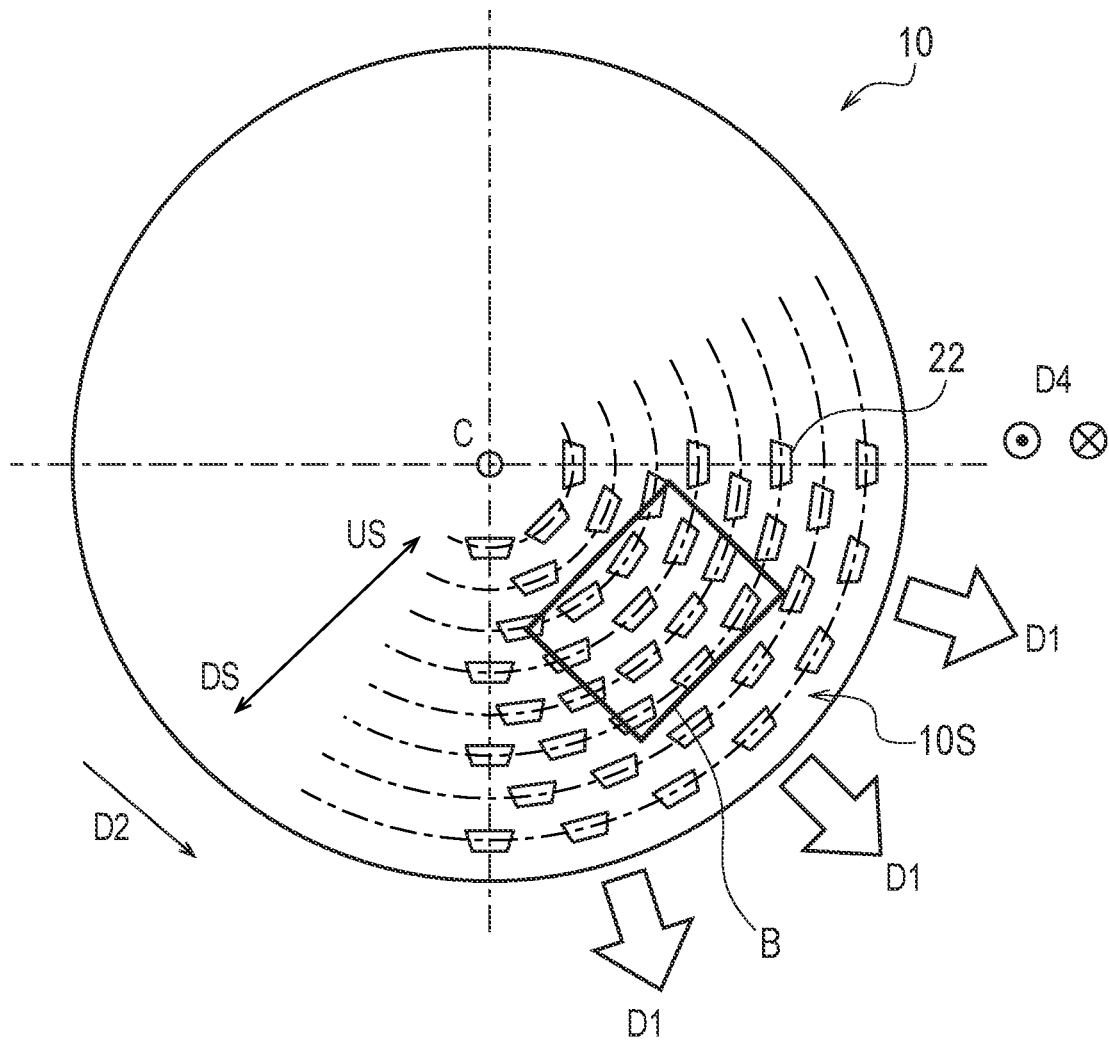
FIGS. 2A and 2B are diagrams for explaining an example of a dispersion table of the combination weighing apparatus according to the embodiment.

Hereinafter, the present embodiment will be described in detail with reference to the attached drawings. In the following description of the drawings, the same or similar parts are denoted by the same or similar reference symbols. However, note that the drawings are schematic, and ratios of dimensions are different from actual ones. Therefore, specific dimensions and the like are determined in consideration of the following description. Moreover, there may be portions where dimensional relationships or proportions are different among the drawings. In this specification and the drawings, elements having substantially the same function and configuration are denoted by the same reference numerals to omit redundant description, and elements not directly related to the present invention are omitted.

First Embodiment

A combination weighing apparatus 1 according to a first embodiment of the present invention is described below with reference to FIGS. 1 to 4.

As illustrated in FIG. 1, the combination weighing apparatus 1 according to the present embodiment includes a dispersion table 10, a driving unit 20, a plurality of conveyors 11, a plurality of pool hoppers 12, a plurality of weighing hoppers 13, a collection discharge chute 15, an obtaining unit 30, and a controller 31.

The dispersion table 10 receives articles (objects to be weighed) that have been supplied from an outside (a supply apparatus), and conveys the articles to the conveyors 11, while dispersing the articles.

Figure 2B:
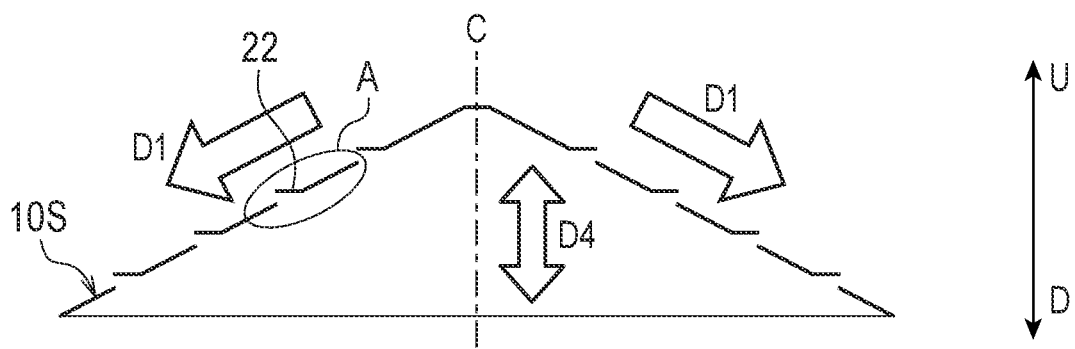

For example, as illustrated in FIGS. 2A and 2B, vibration is applied in a vibration direction D4 of an upward/downward direction U/D by the driving unit 20 described later, and therefore the dispersion table 10 according to the present embodiment conveys the articles toward a downstream side (an outside in a radial direction) DS, while dispersing the articles in a radiation direction D1. In this case, a configuration in which a combination of vibration in the vibration direction D4 described above and vibration in a circumferential direction D2 is applied to the articles may be employed.

Note that the dispersion table 10 is not limited to such a configuration, and may have a mechanism of being driven to rotate around a rotation axis C that extends in the upward/downward direction U/D to convey the articles to the conveyors 11. In other words, any configuration may be employed, if the dispersion table 10 has a function of conveying such articles to the conveyors 11.

For example, such articles are soft and adhesive foods, such as raw chicken. However, the articles are not limited to these. Specific examples include fruit such as prune or cut pineapple, and candies coated with sugar, and any articles may be employed.

The driving unit 20 applies, to the dispersion table 10, conveyance force that causes the articles to be conveyed. In the present embodiment, as illustrated in FIGS. 2A and 2B, the driving unit 20 is configured to apply vibration in the vibration direction D4 of the upward/downward direction U/D to the dispersion table 10.

Each of the conveyors 11 receives the articles from the dispersion table 10, and conveys the articles from an upstream side US toward the downstream side DS. In the present embodiment, each of the conveyors 11 is configured to supply the articles that have been supplied from the dispersion table 10, to the pool hopper 12 that is provided to correspond to the downstream side DS of each of the conveyors 11.

Here, each of the conveyors 11 may include a vibration feeder of a type of conveying the articles by using vibration, or may include a screw feeder of a type of conveying the articles by rotating a screw that is provided in a trough.

Each of the pool hoppers 12 temporarily receives the article that has been discharged from the conveyor 11, and discharges the article to each of the weighing hoppers 13 that is disposed on the downstream side.

Each of the weighing hoppers 13 temporarily retains the article that has been discharged by the pool hopper 12, and weighs a weight value of the article. Each of the weighing hoppers 13 discharges the temporarily retained article to the collection discharge chute 15 that is disposed on the downstream side.

The obtaining unit 30 obtains the weight value of the article that has been retained by each of the weighing hoppers 13. The controller 31 performs combination calculation on the basis of the weight values of the articles that have been obtained by the obtaining unit 30.

The collection discharge chute 15 collects the articles that have been discharged from the plurality of weighing hoppers 13, and drops the articles downward.

An example of the dispersion table 10 of the combination weighing apparatus 1 according to the present embodiment is described below with reference to FIGS. 2 and 3.

As illustrated in FIGS. 2A and 2B, the dispersion table 10 includes a plurality of inclined faces (protrusions) 22 on a surface 10S on which the articles are conveyed. Stated another way, slatted-shutter working has been performed on the surface 10S on which the articles are conveyed in the dispersion table 10. Slatted-shutter working may be louver working.

In the present embodiment, as illustrated in FIGS. 2A and 2B, the plurality of inclined faces 22 is disposed on the surface 10S on which the articles are conveyed in the dispersion table 10.

Figure 3:
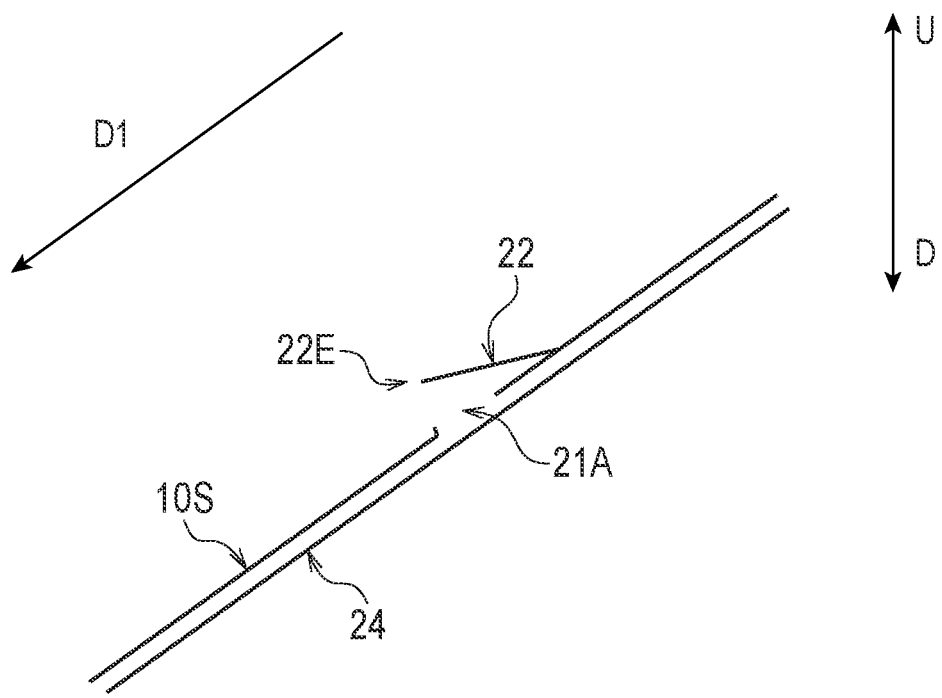
FIG. 3 is an enlarged view of a region A in FIG. 2B.

Here, as illustrated in FIG. 3, the plurality of inclined faces 22 rises along the radiation direction D1. Note that, as illustrated in FIG. 2A, the radiation direction D1 is a direction that is orthogonal to the circumferential direction D2, and goes from the upstream side US to the downstream side DS.

As illustrated in FIG. 3, the respective inclined faces 22 include a plurality of protrusions 22 that is provided on the surface 10S on which the articles are conveyed. Furthermore, as illustrated in FIG. 3, at lower ends 22E in the radiation direction D1 of the plurality of protrusions 22, an opening 21A that faces a reverse face 24 from the surface 10S is disposed.

In other words, as illustrated in FIGS. 3 and 4, the dispersion table 10 includes a first sliding face (the surface) 10S that includes a plurality of openings 21A, and a second sliding face (the inclined face or the protrusion) 22 that closes part of each of the plurality of openings 21A, and is disposed in a position on an upper side U of the dispersion table 10 relative to the first sliding face 10S.

The second sliding face 22 is formed to be continuous to the first sliding face 10S on the upstream side US, a left-hand side L, and a right-hand side R of the opening 21A described above.

Specifically, as illustrated in FIG. 4, the second sliding face 22 includes a left-hand side flat face 22L, a right-hand side flat face 22R, and an upper side flat face 22U.

Here, the left-hand side flat face 22L is formed to rise from the first sliding face 10S toward the upper side U on the left-hand side L of the opening 21A, as illustrated in FIG. 4.

Furthermore, the right-hand side flat face 22R is formed to rise from the first sliding face 10S toward the upper side U on the right-hand side R of the opening 21A, as illustrated in FIG. 4.

Moreover, the upper side flat face 22U is formed to couple the left-hand side flat face 22L to the right-hand side flat face 22R, as illustrated in FIG. 4.

On the surface 10S on which the articles are conveyed in the dispersion table 10, as described above, the articles slide from the upstream side US to the downstream side DS along the first sliding face 10S and the upper side flat faces 22U of the second sliding faces 22 due to driving force from the driving unit 20, or the like, as illustrated in FIGS. 2 and 4.

By employing such a configuration, the inclined faces (the protrusions or the second sliding faces) 22 are provided on the surface 10S on which the article is conveyed in the dispersion table 10. Therefore, an area of contact between the article having high adhesiveness and the surface 10S can be decreased, adhesion of the article to the surface 10S can be reduced, and conveyance control can be appropriately performed.

Moreover, even in a case where the article having high adhesiveness has come into contact with the surface 10S, air flows from the openings 21A. Therefore, an air layer can be formed between the surface 10S and the article, and air pressure is also applied to a portion where the surface 10S is in contact with the article. This can reduce adhesion of the article to the surface 10S.

Note that a configuration in which the openings 21A are formed has been described above. However, this configuration is not restrictive, and a configuration in which the openings 21A are absent may be employed.

Furthermore, a movement of the article to the upstream side US is regulated by the lower end 22E, and therefore the article is smoothly conveyed to the downstream side DS.

Second Embodiment

A combination weighing apparatus 1 according to a second embodiment is described below with reference to FIG. 5, focusing on a difference from the combination weighing apparatus 1 according to the first embodiment that has been described above.

Figure 5A:
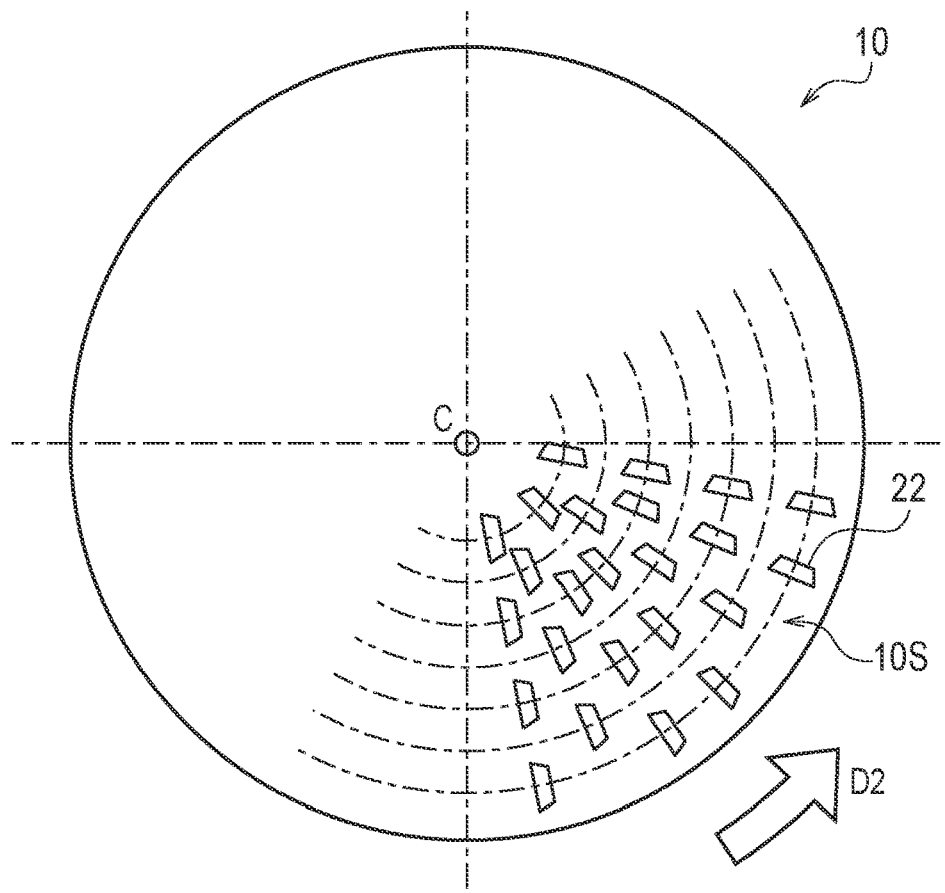
FIGS. 5A to 5C are diagrams for explaining an example of a dispersion table of a combination weighing apparatus according to an embodiment.

In the present second embodiment, as illustrated in FIG. 5A, the dispersion table 10 is driven to rotate around the rotation axis C that extends in the upward/downward direction U/D to convey the articles toward the conveyors 11.

Figure 5B:
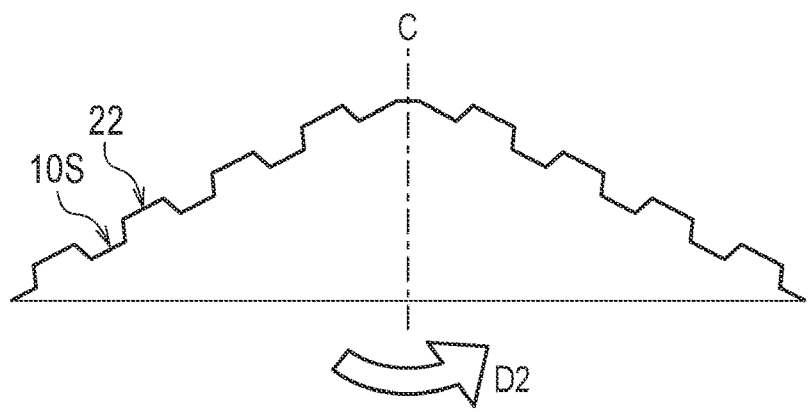

Here, in the present second embodiment, as illustrated in FIGS. 5A and 5B, a plurality of inclined faces 22 that rises along the circumferential direction D2 is disposed on the surface 10S on which the articles are conveyed in the dispersion table 10.

Figure 5C:
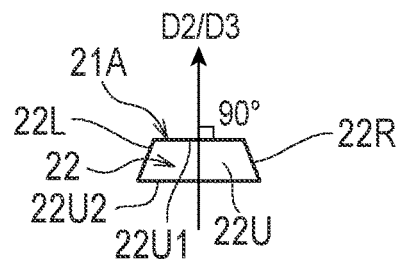

Stated another way, in the present second embodiment, as illustrated in FIG. 5C, in a plan view, a direction D3 in which the inclined faces 22 rise matches the circumferential direction D2. Note that, as illustrated in FIG. 5C, in a plan view, the upper side flat face 22U has a trapezoidal shape, and the direction D3 in which the inclined faces 22 rise and the circumferential direction D2 are orthogonal to an upper side 22U1 and a lower side 22U2 in the upper side flat face 22U.

Variation 1

A combination weighing apparatus 1 in a first variation is described below with reference to FIG. 6, focusing on a difference from the combination weighing apparatus 1 according to the second embodiment that has been described above.

Figure 6:
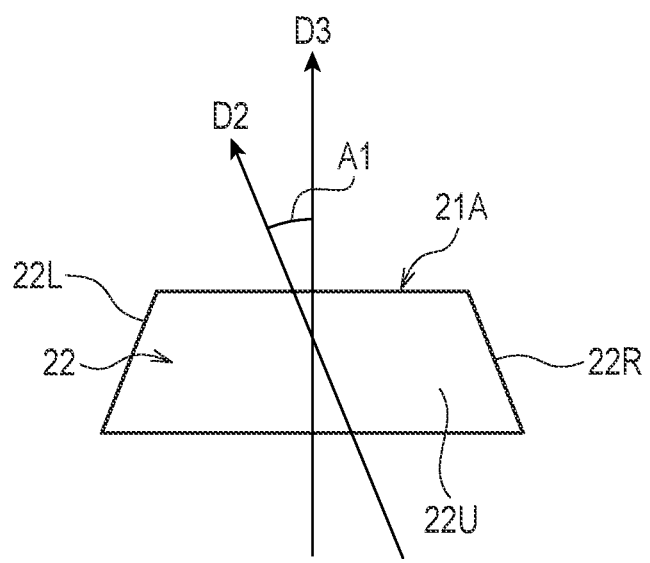
FIG. 6 is a diagram for explaining an example of an inclined face that is disposed on a surface of a dispersion table of a combination weighing apparatus in a variation.

As illustrated in FIG. 6, in the present first variation, the direction D3 in which the inclined faces 22 rise deviates from the circumferential direction D2 by a predetermined angle A1.

By employing such a configuration, the inclined faces 22 can be formed to correspond to an actual track along which the articles are conveyed on the dispersion table 10, and therefore adhesion of the articles can be further reduced, and conveyance performance can be improved.

Variation 2

A combination weighing apparatus 1 in a second variation is described below with reference to FIGS. 7 and 8, focusing on a difference from the combination weighing apparatuses 1 according to the first and second embodiments that have been described above.

Figure 7:
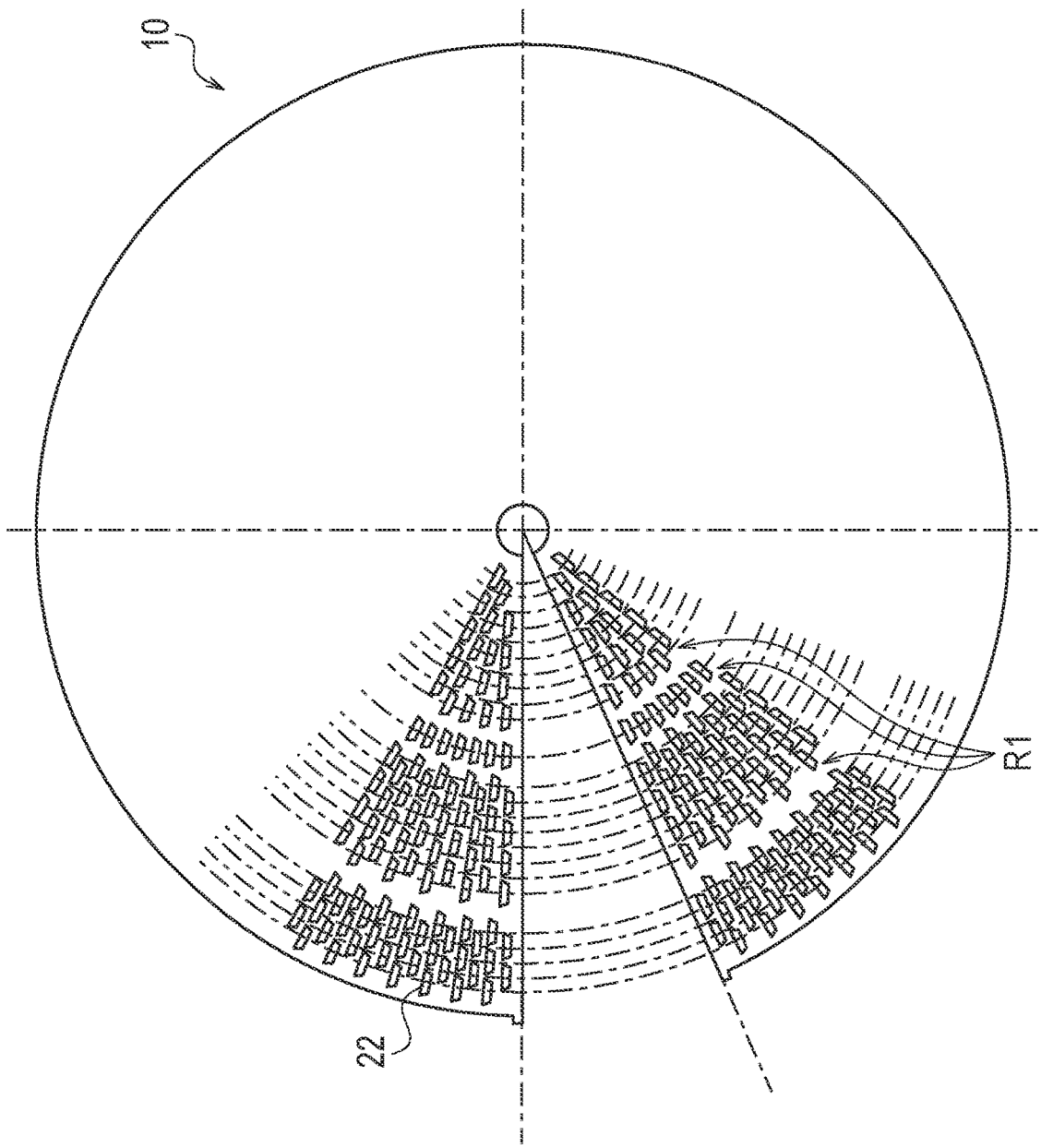
FIG. 7 is a diagram for explaining an example of a dispersion table of a combination weighing apparatus in a variation.

As illustrated in FIG. 7, in the present second variation, a region R1 where the inclined faces 22 are not disposed may be provided along the circumferential direction D2.

Figure 8:
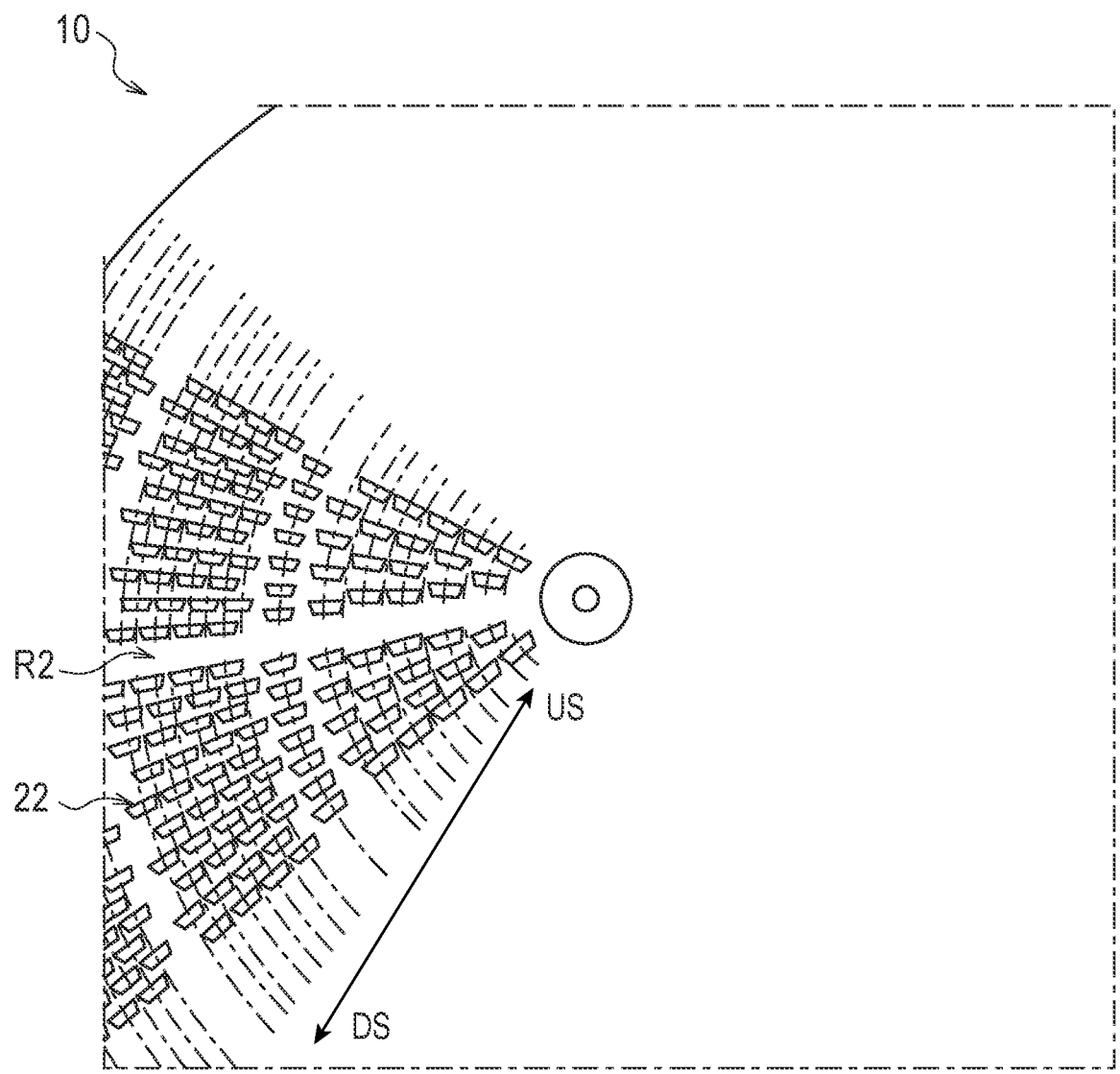
FIG. 8 is a diagram for explaining an example of the dispersion table of the combination weighing apparatus in the variation.

Alternatively, as illustrated in FIG. 8, in the present second variation, a region R2 where the inclined faces 22 are not disposed may be provided along the radiation direction D1.

By employing such a configuration, welding can be performed in the region R1 or the region R2 that has been described above. Alternatively, a reinforcing member of the dispersion table 10 can be disposed on the reverse face 24 of the region R1 or the region R2 that has been described above.

Variation 3

A combination weighing apparatus 1 in a third variation is described below with reference to FIG. 9, focusing on a difference from the combination weighing apparatuses 1 according to the first and second embodiments that have been described above.

Figure 9:
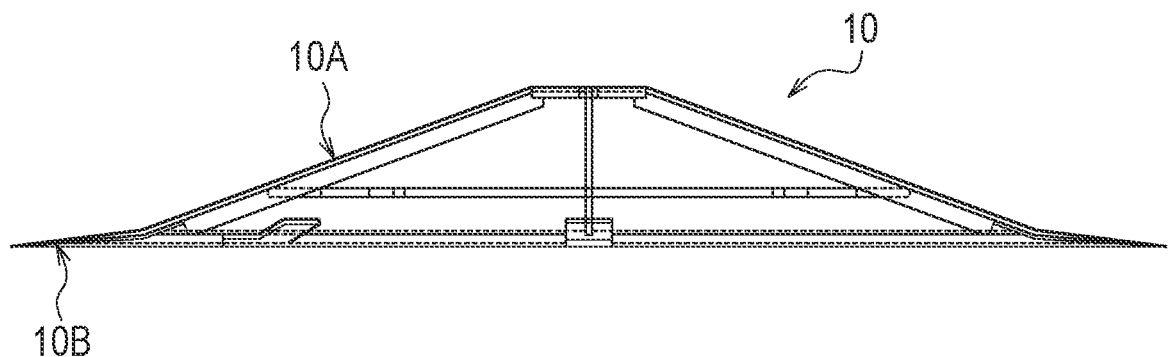
FIG. 9 is a diagram for explaining an example of a dispersion table of a combination weighing apparatus in a variation.

As illustrated in FIG. 9, in the third variation, the dispersion table 10 may have a shape in which a cone 10A having an acute vertex angle is coaxially superimposed onto a center of a cone 10B having an obtuse vertex angle. The diameter of the cone 10B is larger than the diameter of the cone 10A.

By employing the combination weighing apparatus 1 described above, the inclined faces 22 can avoid adhesion of the adhesive articles to the surface 10S the dispersion table 10.

Furthermore, by employing the combination weighing apparatus 1 described above, the conveyance force of the conveyors 11 to be applied to the articles can be improved due to the lower ends 22E of the inclined faces 22.

Furthermore, by employing the combination weighing apparatus 1 described above, the inclined faces 22 are disposed to correspond to a direction in which the conveyance force is applied (the circumferential direction D2 or the radiation direction D1), and therefore the conveyance force can be increased, and dispersiveness can be improved simultaneously. For example, in the case of the dispersion table 10 that conveys the articles by using vibration, the plurality of inclined faces 22 is disposed along the radiation direction D1. In the case of the dispersion table 10 that is rotated by using a motor to convey the articles, the plurality of inclined faces 22 is disposed along the circumferential direction D2. Therefore, a conveyance ability in an intended direction can be improved.

Moreover, by employing the combination weighing apparatus 1 described above, an inclination angle of the dispersion table 10 can be decreased, and this can solve a problem in which the height of the combination weighing apparatus 1 increases.

Although the present invention is explained in detail using the above-mentioned embodiments, it will be apparent to those skilled in the art that the present invention is not limited to the embodiments described herein. The present invention can be implemented as modifications and changes without departing from the spirit and scope of the present invention defined by the description of the claims. Accordingly, the description of the present specification is for the purpose of illustration and is not intended to limit the present invention in any way.

What is claimed is:
1. A combination weighing apparatus comprising:
a dispersion table that receives and conveys an article that has been supplied from an outside;

a driving unit that applies conveyance force to the dispersion table, the conveyance force causing the article to be conveyed;

a plurality of conveyors that receives the article from the dispersion table, and conveys the article toward a downstream side;

a plurality of hoppers that temporarily receives a plurality of the articles that has been discharged from the plurality of conveyors, and discharges the plurality of the articles to the downstream side;

an obtaining unit that obtains a weight value of the article that is retained in each of the plurality of hoppers; and a controller that performs combination calculation on a basis of the weight value that has been obtained by the obtaining unit, wherein on a surface on which the article is conveyed in the dispersion table, a plurality of inclined faces is disposed, the plurality of inclined faces rising along a circumferential direction or a radiation direction.

2. The combination weighing apparatus according to claim 1, wherein the plurality of inclined faces includes a plurality of protrusions that is provided on the surface on which the article is conveyed, and at lower ends in the circumferential direction or the radiation direction of the plurality of protrusions, an opening that faces a reverse face from the surface is disposed.

3. The combination weighing apparatus according to claim 1, wherein in a plan view, a direction in which the plurality of inclined faces rises deviates from the circumferential direction by a predetermined angle.

4. The combination weighing apparatus according to claim 1, wherein the radiation direction is a direction that is orthogonal to the circumferential direction, and goes from an upstream side to the downstream side.

5. The combination weighing apparatus according to claim 1, wherein a region where the plurality of inclined faces is not disposed is provided along the circumferential direction.

6. The combination weighing apparatus according to claim 1, wherein a region where the plurality of inclined faces is not disposed is provided along the radiation direction.

* * * * *